United States Patent
Sun (10) Patent No.: US 10,812,733 B2
(45) Date of Patent: Oct. 20, 2020

(54) CONTROL METHOD, CONTROL DEVICE, MOBILE TERMINAL, AND COMPUTER-READABLE STORAGE MEDIUM

(71) Applicant: GUANGDONG OPPO MOBILE TELECOMMUNICATIONS CORP., LTD., Dongguan, Guangdong (CN)

(72) Inventor: Jianbo Sun, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/476,233

(22) PCT Filed: Jan. 4, 2018

(86) PCT No.: PCT/CN2018/071307
§ 371 (c)(1),
(2) Date: Jul. 5, 2019

(87) PCT Pub. No.: WO2018/127080
PCT Pub. Date: Jul. 12, 2018

(65) Prior Publication Data
US 2019/0356833 A1 Nov. 21, 2019

(30) Foreign Application Priority Data
Jan. 5, 2017 (CN) .......................... 2017 1 0007779

(51) Int. Cl.
*H04N 5/235* (2006.01)
*G06K 9/00* (2006.01)
(Continued)

(52) U.S. Cl.
CPC ....... *H04N 5/2353* (2013.01); *G06K 9/00114* (2013.01); *G06K 9/4661* (2013.01);
(Continued)

(58) Field of Classification Search
CPC ............. G06K 9/00114; G06K 9/4661; H04N 5/23212; H04N 5/2351; H04N 5/2353; H04N 9/045; H04N 9/735
See application file for complete search history.

(56) References Cited

U.S. PATENT DOCUMENTS 6,727,942 B1   4/2004   Miyano
6,809,763 B1 * 10/2004   Yoshida ............... H04N 5/3595
                                                  348/222.1
(Continued)

FOREIGN PATENT DOCUMENTS

CN    1443009 A      9/2003
CN    101494738 A    7/2009
(Continued)

OTHER PUBLICATIONS

International Search Report of PCT/CN2018/071307, dated Mar. 28. 2018.
(Continued)

*Primary Examiner* — Amy R Hsu (57) ABSTRACT

Provided is a control method for controlling an imaging device. The control method includes operations that: a cached image output by an imaging device is processed to identify whether there is an overexposed area; in a case where there is the overexposed area, an RGB channel value of a surrounding area around the overexposed area is acquired; and white balance processing is performed on the cached image according to the RGB channel value. Further provided are a control device, a mobile terminal and a computer-readable storage medium.

20 Claims, 12 Drawing Sheets (51) Int. Cl.
*G06K 9/46* (2006.01)
*H04N 5/232* (2006.01)
*H04N 9/04* (2006.01)
*H04N 9/73* (2006.01)

(52) U.S. Cl.
CPC ....... *H04N 5/2351* (2013.01); *H04N 5/23212* (2013.01); *H04N 9/045* (2013.01); *H04N 9/735* (2013.01)

(56) References Cited

U.S. PATENT DOCUMENTS

| | | | |
|---|---|---|---|
| 6,876,384 B1* | 4/2005 | Hubina | H04N 9/735 348/222.1 |
| 10,270,981 B2* | 4/2019 | Meuter | H04N 19/428 19/428 |
| 2006/0001748 A1* | 1/2006 | Kamon | H04N 5/35509 348/234 |
| 2007/0035641 A1* | 2/2007 | Yamada | H04N 9/045 348/241 |
| 2007/0041064 A1* | 2/2007 | Subbotin | H04N 1/6086 358/516 |
| 2007/0047803 A1 | 3/2007 | Nikkanen | |
| 2009/0153695 A1* | 6/2009 | Kikuchi | H04N 5/23212 348/222.1 |
| 2009/0167892 A1* | 7/2009 | Takayama | H04N 9/735 348/223.1 |
| 2010/0231746 A1* | 9/2010 | Nomura | H04N 9/735 348/223.1 |
| 2014/0184894 A1* | 7/2014 | Motta | H04N 9/045 348/362 |
| 2017/0006272 A1* | 1/2017 | Ioka | H04N 9/735 |
| 2017/0180692 A1* | 6/2017 | Sunkavalli | G06K 9/4671 |

FOREIGN PATENT DOCUMENTS

| | | |
|---|---|---|
| CN | 102572286 A | 7/2012 |
| CN | 104301621 A | 1/2015 |
| CN | 104581105 A | 4/2015 |
| CN | 106131526 A | 11/2016 |
| CN | 106851121 A | 6/2017 |
| EP | 1786215 A2 | 5/2007 |
| JP | 2009201094 A | 9/2009 |
| JP | 2010271733 A | 12/2010 |
| KR | 20100104498 A | 9/2010 |

OTHER PUBLICATIONS

First Chinese Office Action dated Feb. 3, 2019; Appln. No. 201710007779.3.
Notice of Grant dated May 14, 2019; Appln. No. 201710007779.3.
The extended European search report for the EP patent application No. 18735915.3, dated Dec. 9, 2019.

* cited by examiner

CONTROL METHOD, CONTROL DEVICE, MOBILE TERMINAL, AND COMPUTER-READABLE STORAGE MEDIUM

CROSS-REFERENCE TO RELATED APPLICATIONS

The present application is a national stage application of International Patent Application No. PCT/CN2018/071307, which is filed on Jan. 4, 2018 and claims priority to China Patent Application No. 201710007779.3, filed on Jan. 5, 2017, the contents of which are hereby incorporated by reference in its entirety.

TECHNICAL FIELD

The disclosure relates to consumer electronics technologies, and more particularly to a control method, a control device, a mobile terminal, and a computer-readable storage medium.

BACKGROUND

The white balance method in related technologies is to find an area with a color close to white in an image to estimate a color temperature of a current light source. However, this white balance method cannot be used in some occasions. For example, in night scene shooting, except for a light source, other areas are generally black, and there is no area with a color close to white.

SUMMARY

Embodiments of the disclosure provide a control method, a control device, a mobile terminal, and a computer-readable storage medium.

An image processing method for controlling an imaging device is provided. The control method may include the following operations.

A cached image output by the imaging device is processed to identify whether there is an overexposed area.

In a case where there is the overexposed area, an RGB channel value of a surrounding area around the overexposed area is acquired.

White balance processing is performed on the cached image according to the RGB channel value.

A control device for controlling an imaging device is provided. The control device may include:

a judgment module, configured to process a cached image output by the imaging device to identify whether there is an overexposed area;

an acquisition module, configured to acquire, in a case where there is the overexposed area, an RGB channel value of a surrounding area around the overexposed area; and a first processing module, configured to perform white balance processing on the cached image according to the RGB channel value.

A mobile terminal is provided, which may include a housing, a processor, a memory, a circuit board, a power circuit and an imaging device. The circuit board may be disposed inside a space enclosed by the housing, and the processor and the memory may be disposed on the circuit board. The power circuit may be configured to supply power to various circuits or devices of an electronic device. The memory may be configured to store executable program codes. The processor may run programs corresponding to the executable program codes by reading the executable program codes stored in the memory to execute the control method.

A computer-readable storage medium is provided, which may have an instruction stored therein. When a processor of an electronic device executes the instruction, the electronic device may execute the control method.

According to the control method, the control device, the mobile terminal and the computer-readable storage medium of the embodiments of the disclosure, white balance processing is performed on a cached image by acquiring a color temperature of a surrounding area around an overexposed area, so that the white balance is more accurate, and there is no limit to use occasions.

Additional aspects and advantages of the disclosure will be set forth in part in the following description. Some will become apparent from the following description, or will be understood by the practice of the disclosure.

BRIEF DESCRIPTION OF THE DRAWINGS

The above and/or additional aspects and advantages of the disclosure will become apparent and readily understood from the description of the embodiments in conjunction with the accompanying drawings, where FIG. 1 schematically shows a flowchart of a control method according to an embodiment of the disclosure.

DETAILED DESCRIPTION OF THE EMBODIMENTS

The embodiments of the disclosure are described in detail below, and the examples of the embodiments are illustrated in the drawings, where the same or similar reference numerals are used to refer to the same or similar elements or elements having the same or similar functions. The embodiments described below with reference to the drawings are intended to be illustrative of the disclosure and are not to be construed as limiting the disclosure.

Figure 1:
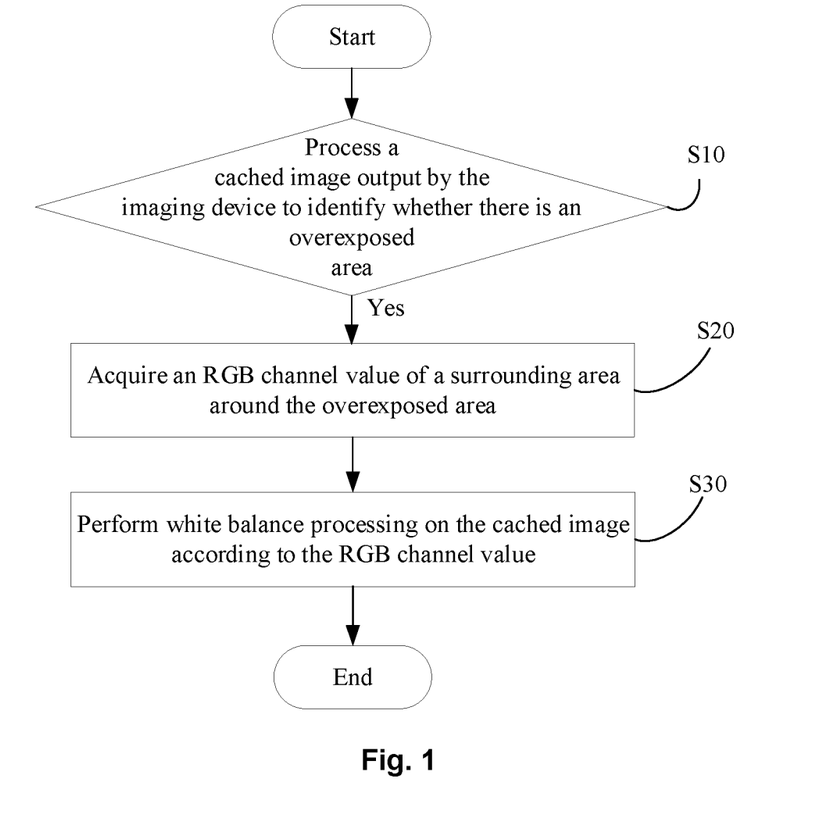

Referring to FIG. 1, an embodiment of the disclosure provides a control method for controlling an imaging device. The method includes the operations as follows.

In operation S10, a cached image output by the imaging device is processed to identify whether there is an overexposed area.

In operation S20, in a case where there is the overexposed area, an RGB channel value of a surrounding area around the overexposed area is acquired.

In operation S30, white balance processing is performed on the cached image according to the RGB channel value.

Figure 2:
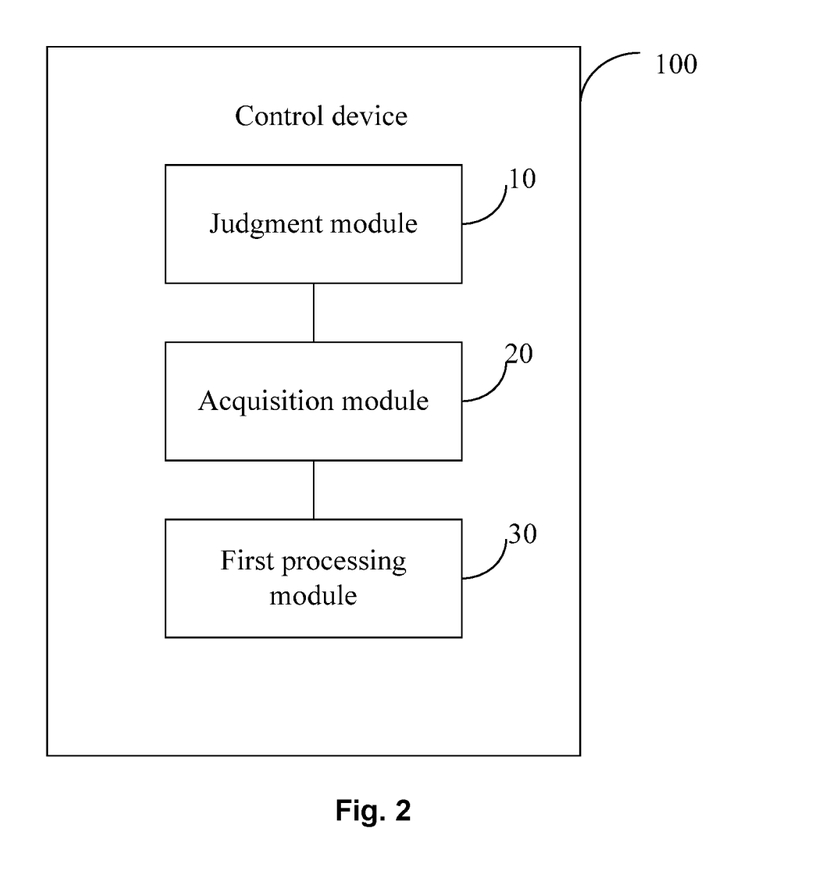
FIG. 2 schematically shows functional modules of a control device according to an embodiment of the disclosure.

Referring to FIG. 2, an embodiment of the disclosure provides a control device 100, which includes a judgment module 10, an acquisition module 20 and a first processing module 30. As an example, the control method of the embodiment of the disclosure may be implemented by the control device 100 of the embodiment of the disclosure. The control method of the embodiment of the disclosure may be applied to an imaging device and may control the imaging device, where the imaging device may be a front or rear camera of a mobile terminal.

The operation S10 of the control method of the embodiment of the disclosure may be implemented by the judgment module 10, the operation S20 may be implemented by the acquisition module 20, and the operation S30 may be implemented by the first processing module 30. That is, the judgment module 10 is configured to process a cached image output by the imaging device to identify whether there is an overexposed area. The acquisition module 20 is configured to acquire, in a case where there is the overexposed area, an RGB channel value of a surrounding area around the overexposed area. The first processing module 30 is configured to perform white balance processing on the cached image according to the RGB channel value.

Due to the unique adaptability of human eyes, sometimes the change of a color temperature cannot be sensed. For example, a person, when being under a tungsten lamp for a long time, may not feel that a white paper under the tungsten lamp is reddish. If a fluorescent lamp is suddenly changed to the tungsten lamp for illumination, he/she will sense that the color of the white paper is reddish, but this feeling can only last for a short time. The imaging device is not as adaptable as the human eyes, so if the color adjustment of the imaging device is inconsistent with the color temperature of scene illumination, color cast occurs. White balance is to offset the color cast of a captured image by adjusting a color circuit inside the imaging device for different color temperature conditions, which is closer to the visual habit of the human eyes. In other words, the white balance refers to that, under arbitrary color temperature conditions, a standard white color that is being captured by the imaging device can still be white after imaging through the adjustment of a circuit.

Figure 3:
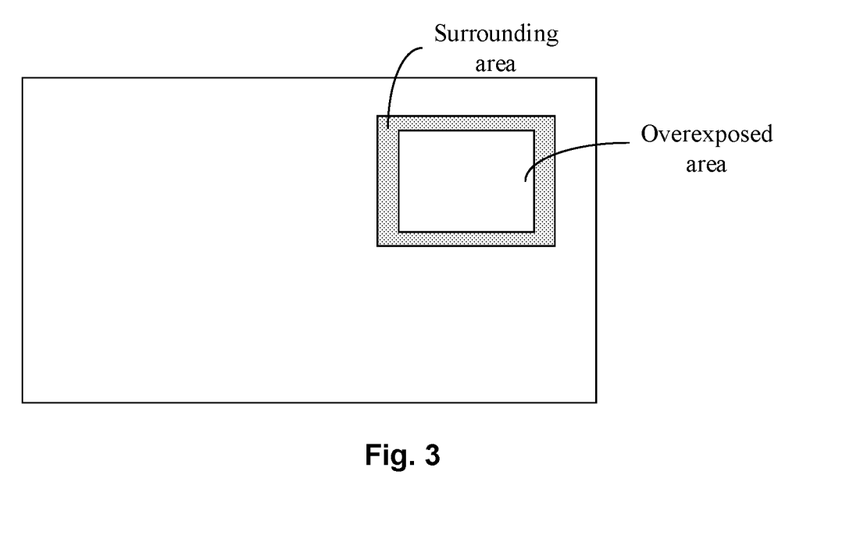
FIG. 3 schematically shows a state of a control method according to some embodiments of the disclosure.

Referring to FIG. 3, generally, in the process of performing white balance processing, the processing is performed by searching for a near white or gray area in the cached image instead of directly measuring relevant parameters of a light source. In some scenes, there may be only light sources in the scene without any gray object scenes. For example, in a night scene shooting, except for a light source and an area near the light source, other objects are mostly black, and therefore white balance processing is limited in such a situation. In the embodiment of the disclosure, the cached image is processed to identify whether there is an overexposed area. Generally, the RGB channel value for the overexposed area is 255, the cached image may be in an RGB format, and the RGB channel value in the cached image is detected to determine whether there is an overexposed area. For example, when the shooting scene is a night scene, the light source is usually overexposed when imaging, and when detecting the RGB channel value in the cached image, in a case where an area with an RGB channel value of 255 is detected, this area is considered to correspond to a light source. Since the light source is overexposed during imaging, the RGB channel values are all 255, and the true color of the light source cannot be known, so the white balance processing cannot be performed according to the RGB channel value of the light source. In the imaging process, the area around the light source will scatter a halo. Although the light source is overexposed, the surrounding area of the light source is normally exposed, that is, the halo is not overexposed, and the halo has the same color as the light source. Since the halo is normally exposed, the color of the light source can be derived by acquiring the color of the halo. For example, pixel points having RGB channels less than 255 can be searched for around the overexposed area and the determination can be performed based on the found pixel points. In operation, a user may push a focusing motor to make a picture out of focus, so that the light source presents a larger scattering area on an image sensor to facilitate acquisition of more non-overexposed information.

During the white balance process, average values $\overline{R}$, $\overline{G}$ and $\overline{B}$ of three channel values of a halo area are determined to calculate a gain of an R channel and a gain of a B channel, $K_R = \overline{G}/\overline{R}$, $K_B = \overline{G}/\overline{B}$, and adjusted R and B values, denoted as R' and B', of each pixel are further calculated according to the calculated gains, $R' = K_R * R$, $B' = K_R * R$, thereby performing color cast correction to achieve white balance processing.

In some examples, a color temperature curve is further acquired according to $K_R/K_B$ fitting, white balance processing is performed according to the color temperature curve, and no further description is made here.

In other examples, in a case where it is detected that there are other gray object scenes in addition to the light source in the current image, it is suggested to consider the weight of the acquired RGB channel value of the light source. For example, in a case where there is both an overexposed area and a large area of white area in the image, such as a white wall, a large area having an RGB channel value of 255 can be detected during image detection, and white balance processing may be performed by directly using the white area.

In summary, according to the control method and the control device 100 of the embodiments of the disclosure, a surrounding area, i.e., a halo scattered by a light source, having the same color as an overexposed area, i.e., the light source, is utilized, an RGB channel value at a non-overexposed halo replaces an RGB channel value of the overexposed light source to indirectly acquire an RGB channel value at the light source, and white balance processing is performed on a cached image according to the RGB channel value, so that the white balance is more accurate. In some shooting scenes, since there is no need to search for a near gray area in a picture to estimate a color temperature of the light source, this solution is not limited by the shooting occasion.

Figure 4:
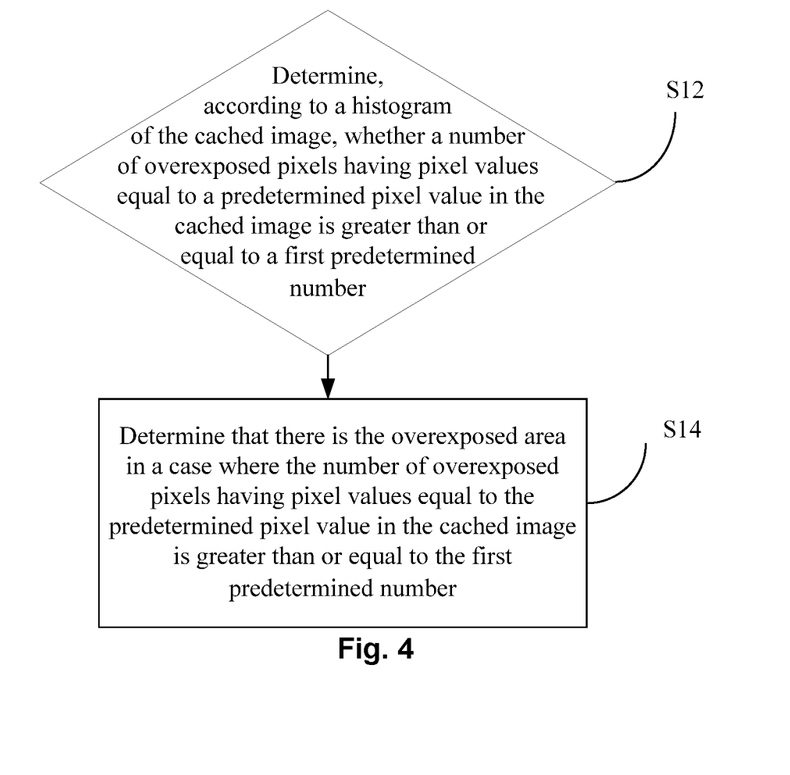
FIG. 4 schematically shows a flowchart of a control method according to some embodiments of the disclosure.
Figure 5:
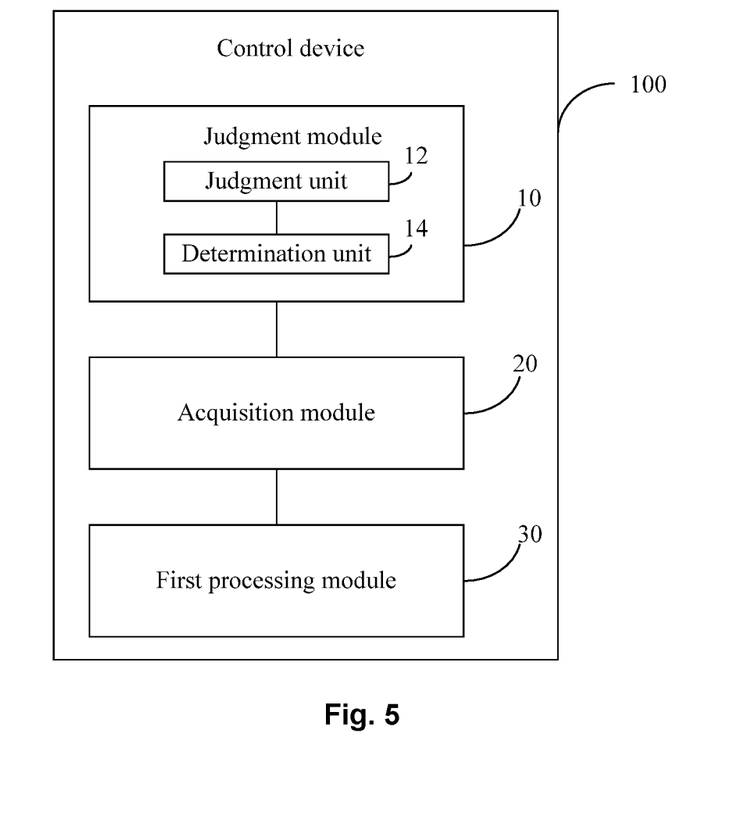
FIG. 5 schematically shows functional modules of a control device according to some embodiments of the disclosure.
Figure 6:
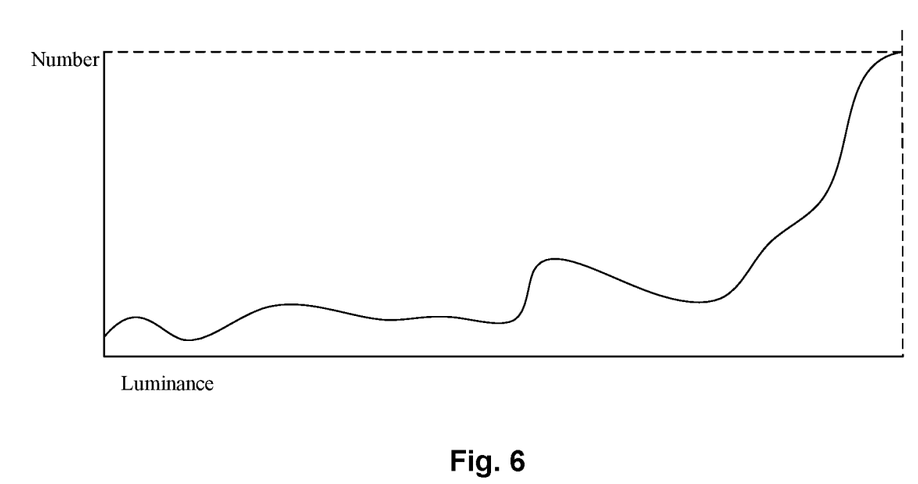
FIG. 6 schematically shows a state of a control method according to some embodiments of the disclosure.

Referring to FIG. 4 to FIG. 6, in some embodiments, the operation S10 includes the operations S12 and S14 as follows.

In operation S12, it is determined, according to a histogram of the cached image, whether a number of overexposed pixels having pixel values equal to a predetermined pixel value in the cached image is greater than or equal to a first predetermined number.

In operation S14, it is determined that there is the overexposed area in a case where the number of the overexposed pixels is greater than or equal to the first predetermined number.

In some embodiments, the judgment module 10 includes a judgment unit 12 and a determination unit 14. The operation S12 may be implemented by the judgment unit 12, and the operation S14 may be implemented by the determination unit 14. Or, the judgment unit 12 is configured to determine, according to a histogram of the cached image, whether a number of overexposed pixels having pixel values equal to a predetermined pixel value in the cached image is greater than or equal to a first predetermined number, and the determination unit 14 is configured to determine that there is the overexposed area in a case where the number of the overexposed pixels is greater than or equal to the first predetermined number.

In general, the horizontal axis of a histogram of the cached image represents an increase in luminance from left to right, and the vertical axis represents an increase in the number of pixels at a certain luminance from bottom to top. The range of luminance is 0-255, representing a change from black to white. In the histogram of the cached image, a higher peak at a certain point means more pixels at this luminance.

The first predetermined number should be the number of pixels in the histogram near the right side of the boundary, that is, the number of overexposed pixels. The first predetermined number may be set to be, for example, one third of the total pixels. It is to be noted that the setting of one third of the total pixels is for illustrative purposes only and is not to limit the invention. By setting the first predetermined number, noise interference can be eliminated. In a case where the number of overexposed pixels in the cached image is greater than or equal to the first predetermined number, it may be determined that there is an overexposed area in the cached image.

Figure 7:
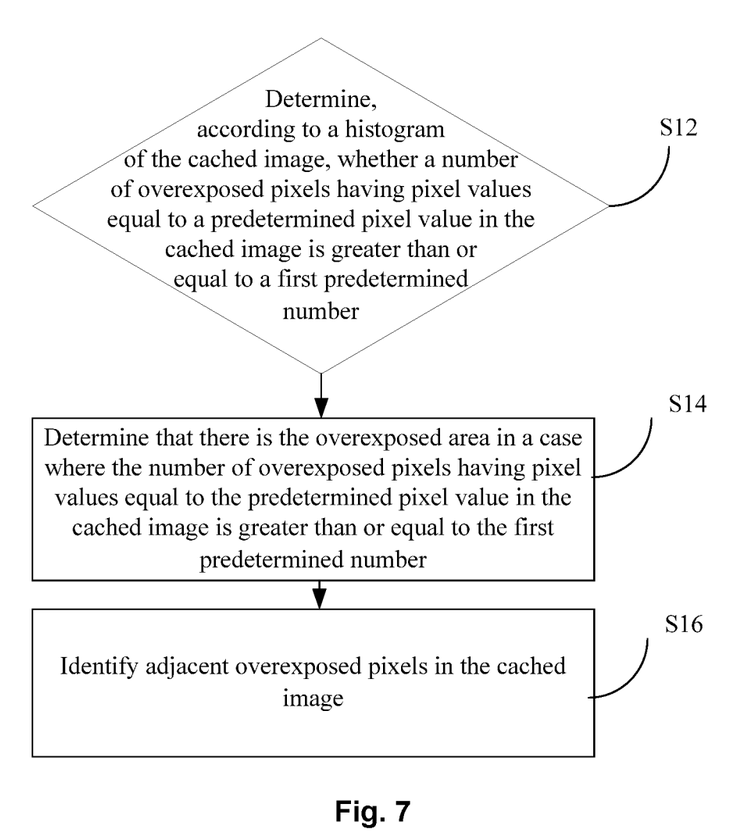
FIG. 7 schematically shows a flowchart of a control method according to some embodiments of the disclosure.
Figure 8:
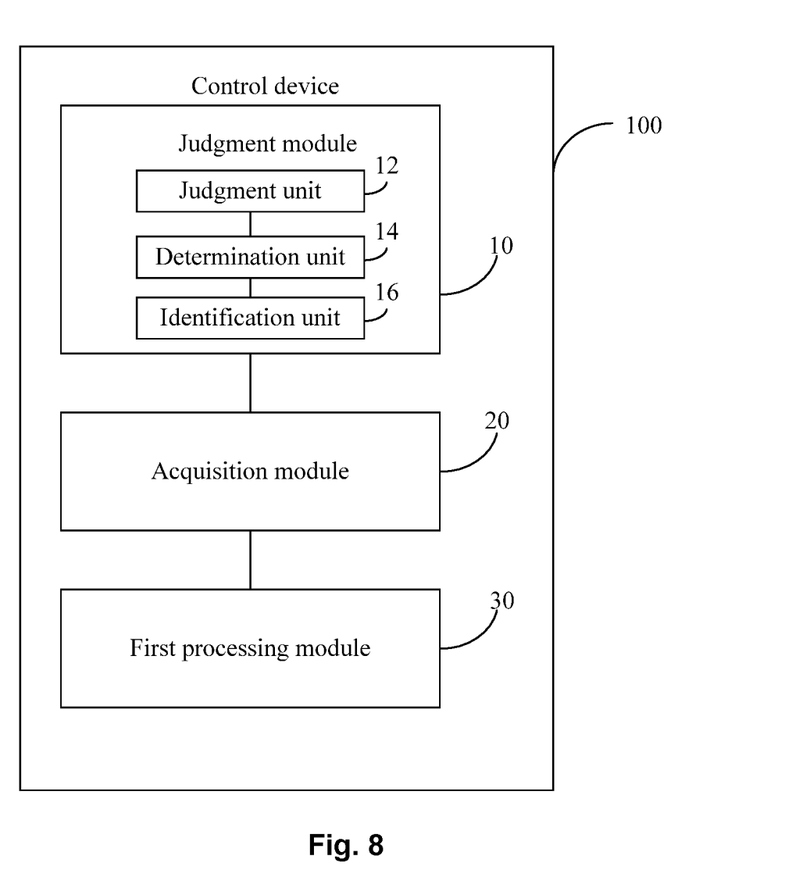
FIG. 8 schematically shows functional modules of a control device according to some embodiments of the disclosure.

Referring to FIG. 7 and FIG. 8, in some embodiments, the operation S10 may further include an operation S16 as follows.

In operation S16, adjacent overexposed pixels in the cached image are identified in a case where there is the overexposed area.

In some embodiments, the judgment module 10 further includes an identification unit 16. The operation S16 may be implemented by the identification unit 16. Alternatively, the identification unit 16 is configured to identify adjacent overexposed pixels in the cached image in a case where there is the overexposed area. The number of the adjacent overexposed pixels is greater than or equal to a second predetermined number, a pixel value of the overexposed pixel is equal to a predetermined pixel value, the predetermined pixel value is an upper limit of a dynamic range of the imaging device, and the adjacent overexposed pixels belong to the overexposed area.

It is to be understood that after it is determined that there is an overexposed area, overexposed pixels need to be found, that is, a light source in the cached image needs to be identified. Generally, some of the light sources are mostly continuous areas, or consecutive adjacent pixels. The light source area may be determined by finding greater than or equal to a second predetermined number of consecutive adjacent overexposed pixels. Since an upper limit of a dynamic range of the imaging device is 255, the pixel value of the overexposed pixel may be set to 255. In this way, multiple adjacent pixels having an RGB channel value of 255 are identified in the cached image as a light source, and the light source is subsequently processed accordingly, thereby performing white balance processing on the cached image.

Figure 9:
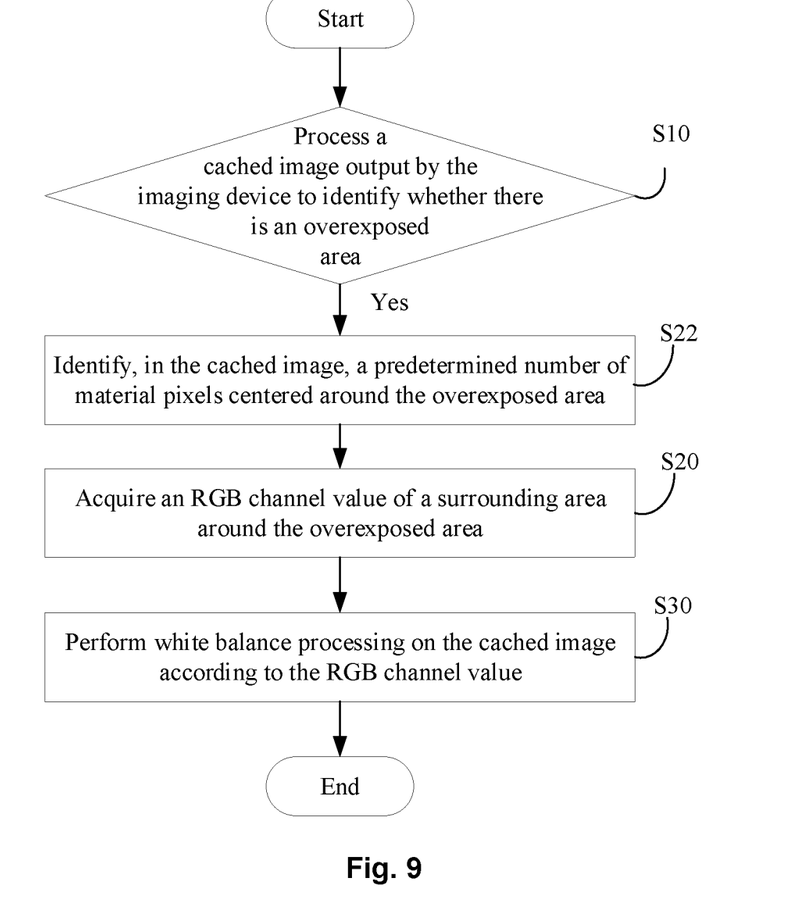
FIG. 9 schematically shows a flowchart of a control method according to some embodiments of the disclosure.
Figure 10:
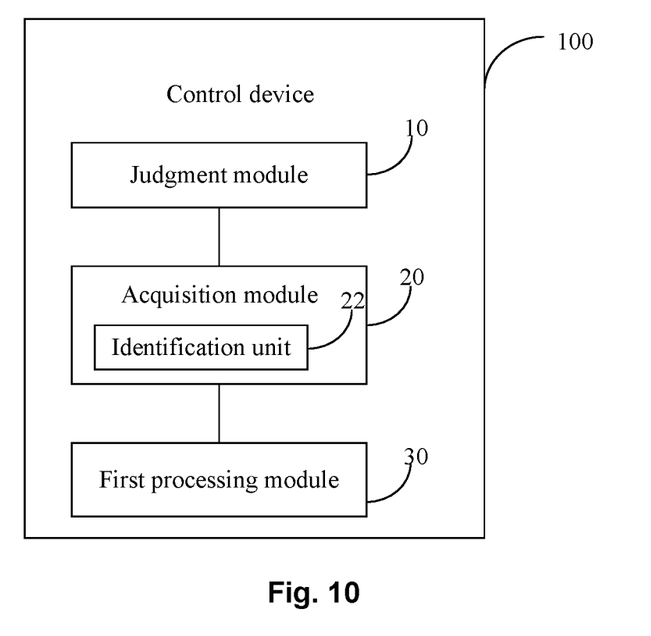
FIG. 10 schematically shows functional modules of a control device according to some embodiments of the disclosure.

Referring to FIG. 9 and FIG. 10, in some embodiments, the operation S20 includes the operation S22 as follows.

In operation S22, in the cached image, a third predetermined number of material pixels centered around the overexposed area are identified.

In some embodiments, the acquisition module 20 includes an identification unit 22. The operation S22 may be implemented by the identification unit 22. Alternatively, the identification unit 22 is configured to identify, in the cached image, a third predetermined number of material pixels centered around the overexposed area, wherein the material pixels belong to the surrounding area.

It is to be understood that the halo exists in a certain area around the light source, and therefore, a third predetermined number of pixels centered around the center of the overexposed area may be determined as material pixels. For example, ten pixels outward may be determined as a surrounding area centering on the center of the overexposed area. Of course, the specific number of pixels is merely used for schematic description and is not a limitation of the disclosure.

In other examples, the overexposed area, that is, the contour of the light source, may be determined after collecting the RGB channel value, and then a third predetermined number of pixels outside the contour of the overexposed area may be determined as the overexposed area. In addition, multiple pixels, having reasonable RGB channel values less than 255, outside the contour may be determined as a halo. For example, in night scene shooting, other objects outside a certain distance around the light source are mostly black. Although the RGB channel values are all less than 255, these pixels still need to be discarded. Using a third predetermined number of pixels may miss some of the pixels in the halo area, however, the accuracy of the collected portion can still be ensured.

In this way, the relevant action of the white balance processing can be performed by determining the halo area according to the light source area.

Figure 11:
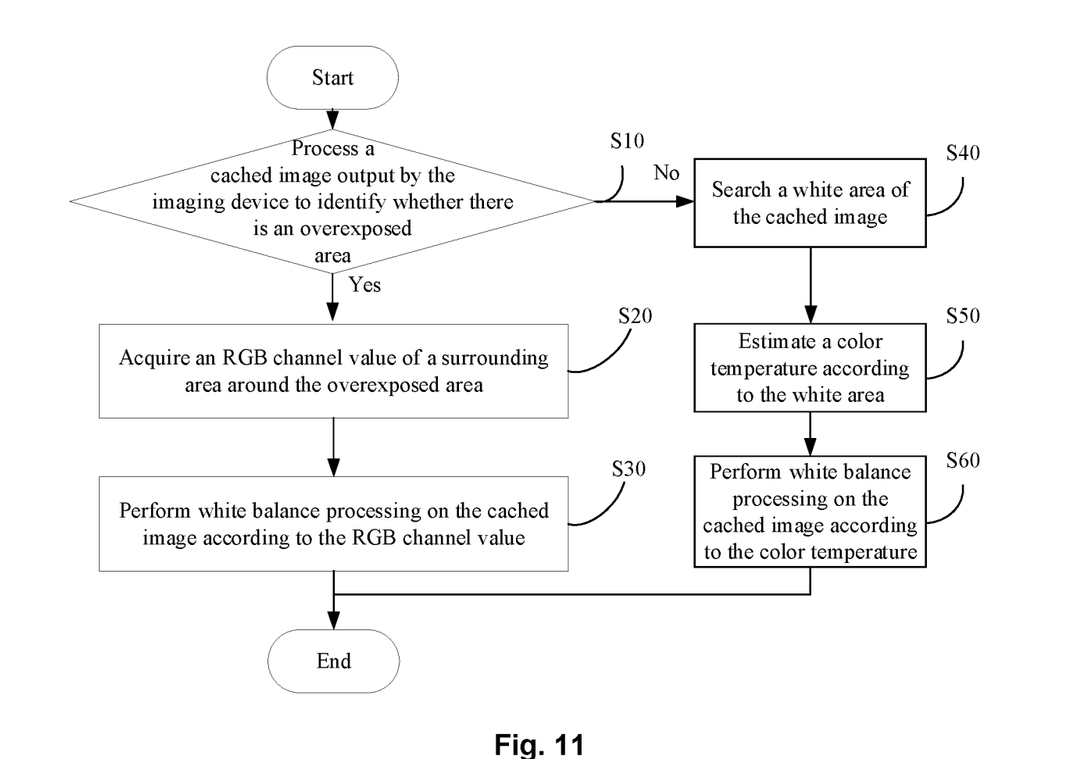
FIG. 11 schematically shows a flowchart of a control method according to some embodiments of the disclosure.
Figure 12:
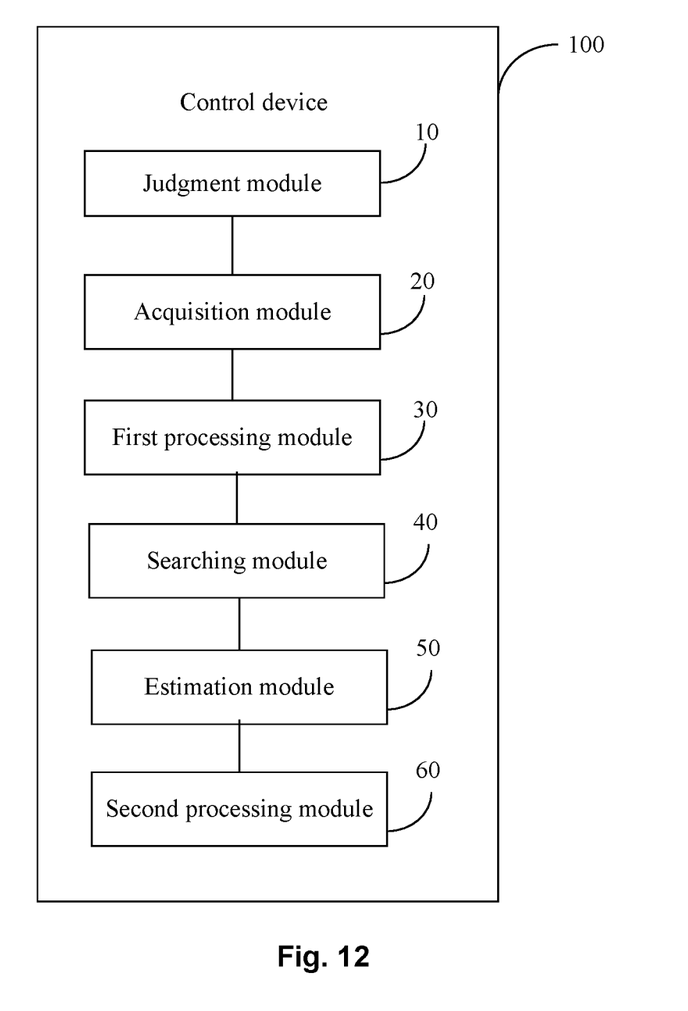
FIG. 12 schematically shows functional modules of a control device according to some embodiments of the disclosure.

Referring to FIG. 11 and FIG. 12, in some embodiments, the control method further includes the operations S40 to S60 as follows.

In operation S40, a white area of the cached image is searched in a case where there is no overexposed area.

In operation S50, a color temperature is estimated according to the white area.

In operation S60, white balance processing is performed on the cached image according to the color temperature.

In some embodiments, the control device 100 further includes a searching module 40, an estimation module 50 and a second processing module 60. The operation S40 may be implemented by the searching module 40, the operation S50 may be implemented by the estimation module 50, and the operation S60 may be implemented by the second processing module 60. Alternatively, the searching module 40 is configured to search for a white area of the cached image in a case where there is no overexposed area, the estimation module 50 is configured to estimate a color temperature according to the white area, and the second processing module 60 is configured to perform white balance processing on the cached image according to the color temperature.

In a case where there is no overexposed area in the cached image, other methods may be used for white balance processing. In some examples, in a case where there are rich colors in the cached image, white balance processing may be performed by using a gray world processing method. In other examples, in a case where there are not so rich colors in the cached image, it is possible to find a white area in the cached image, and herein the white area should be understood to include an area which has a color close to white and satisfies certain constraints. Since there is no overexposed area, that is, there is not such an area in which the RGB channel values of pixels are all 255, the RGB channel values are equal for the white area, and when searching for the white area, the cached image may be divided into M*N areas and the number of white areas is counted. Further, an average value of R/G and B/G of the white areas is calculated, and a color temperature is estimated according to a color temperature curve, so that all possible color temperatures in the image are acquired. A current color temperature may be determined according to the distribution or weight of the white areas, and white balance processing can be performed on the cached image according to the current color temperature. For example, in the divided M*N areas, a total of 100 white areas are selected, and the color temperature of 80 white areas among the 100 white areas is about 4500K, then the current color temperature is determined to be 4500K. White balance processing is performed on the cached image according to the color temperature value.

Figure 13:
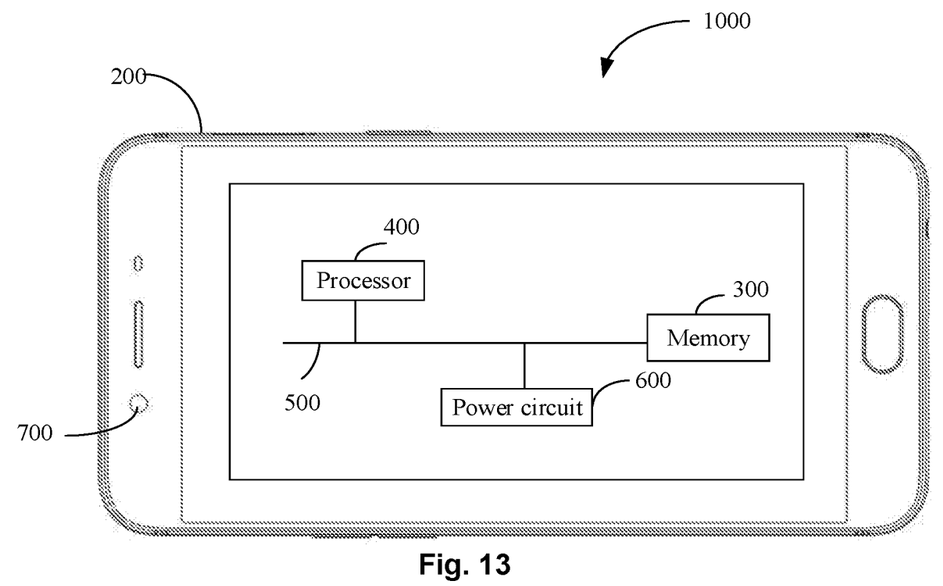
FIG. 13 schematically shows functional modules of a mobile terminal according to an embodiment of the disclosure.

Referring to FIG. 13, an embodiment of the disclosure provides a mobile terminal 1000, which includes a housing 200, a processor 300, a memory 400, a circuit board 500, a power circuit 600, and an imaging device 700. The circuit board 500 is disposed inside a space enclosed by the housing 200, the processor 300 and the memory 400 are disposed on the circuit board 500, and the power circuit 600 is configured to supply power to various circuits or devices of the mobile terminal. The imaging device 700 is configured to capture a shot scene to acquire a cached image. The memory 400 is configured to store executable program codes. The processor 300 runs programs corresponding to the executable program codes by reading the executable program codes stored in the memory to execute the control method in the above-mentioned aspect. In the process of performing white balance processing on the cached image, the processor 300 is configured to perform the following operations.

A cached image output by the imaging device is processed to identify whether there is an overexposed area.

In a case where there is the overexposed area, an RGB channel value of a surrounding area around the overexposed area is acquired.

White balance processing is performed on the cached image according to the RGB channel value.

It is to be noted that the foregoing descriptions of the control method and the control device 100 are also applicable to the mobile terminal 1000 of the embodiment of the disclosure, and details are not described herein again.

The computer-readable storage medium of the embodiment of the disclosure has an instruction stored therein. When the processor 300 of the mobile terminal 1000 executes the instruction, the mobile terminal 1000 executes the control method of the embodiment of the disclosure, the foregoing descriptions of the control method and the control device 100 are also applicable to the computer-readable storage medium of the embodiment of the disclosure, and details are not described herein again.

In summary, according to the mobile terminal 1000 and the computer-readable storage medium of the embodiments of the disclosure, a surrounding area, i.e., a halo scattered by a light source, having the same color as an overexposed area, i.e., the light source, is utilized, an RGB channel value at a non-overexposed halo replaces an RGB channel value of the overexposed light source to indirectly acquire an RGB channel value at the light source, and white balance processing is performed on a cached image according to the RGB channel value, so that the white balance is more accurate, and in some shooting scenes, since there is no need to search for a near gray area in a picture to estimate a color temperature of the light source, it is not limited by the shooting occasion.

In the descriptions of the specification, the descriptions made with reference to terms "an embodiment", "some embodiments", "example", "exemplary implementation", "some examples" or the like refer to that exemplary features, structures, materials or characteristics described in combination with the embodiment or the example are included in at least one embodiment or example of the disclosure. In the specification, these terms are not always schematically expressed for the same embodiment or example. Moreover, the exemplary described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the descriptions of the disclosure, "multiple" means at least two, for example, two and three, unless otherwise limited definitely and specifically.

Any process or method in the flowcharts or described herein in another manner may be understood to represent a module, segment or part including codes of one or more executable instructions configured to realize exemplary logic functions or operations of the process and, moreover, the scope of the preferred embodiment of the disclosure includes other implementation, not in a sequence shown or discussed herein, including execution of the functions basically simultaneously or in an opposite sequence according to the involved functions. This should be understood by those skilled in the art of the embodiments of the disclosure.

Logics and/or operations represented in the flowcharts or described herein in another manner, for example, may be considered as a fixed sequence list of executable instructions configured to realize the logic functions and may be specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. An exemplary implementation (non-exhaustive list) of the computer-readable medium includes: an electric connection portion (electronic device)

with one or more wires, a portable computer disk (magnetic device), a Random-Access Memory (RAM), a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or another medium on which the program may be printed because, for example, the paper or the other medium may be optically scanned then edited, explained or, when necessary, processed in another proper manner to acquire the program in an electronic manner for storage in the computer memory.

It should be understood that each part of the disclosure may be implemented by hardware, software, firmware or a combination thereof. It should be understood that each part of the disclosure may be implemented by hardware, software, firmware or a combination thereof. In the above-mentioned embodiments, multiple operations or methods may be implemented by software or firmware stored in a memory and executed by a proper instruction execution system. For example, in case of implementation with the hardware, like another embodiment, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the operations in the method of the above-mentioned embodiment may be completed through related hardware instructed by a program, the program may be stored in a computer-readable storage medium, and when the program is executed, one or combination of the operations of the method embodiment is included.

In addition, each functional unit in each embodiment of the disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium.

The storage medium may be a ROM, a magnetic disk, an optical disk or the like. The embodiments of the disclosure have been shown or described above. However, it can be understood that the above-mentioned embodiments are exemplary and should not be understood as limits to the disclosure and those of ordinary skill in the art may make variations, modifications, replacements, transformations to the above-mentioned embodiments within the scope of the disclosure.

The invention claimed is:

1. A control method for controlling an imaging device, the control method comprising:
   processing a cached image output by the imaging device to identify whether there is an overexposed area in the cached image;
   acquiring, in a case where there is the overexposed area in the cached image, an RGB channel value of a surrounding area around the overexposed area; and
   performing white balance processing on the cached image according to the RGB channel value.

2. The control method as claimed in claim 1, wherein processing the cached image output by the imaging device to identify whether there is the overexposed area in the cached image comprises:
   determining, according to a histogram of the cached image, whether a number of overexposed pixels having pixel values equal to a predetermined pixel value in the cached image is greater than or equal to a first predetermined number; and
   determining that there is the overexposed area in the cached image in a case where the number of the overexposed pixels is greater than or equal to the first predetermined number.

3. The control method as claimed in claim 2, wherein after determining that there is the overexposed area in the cached image in the case where the number of the overexposed pixels is greater than or equal to the first predetermined number, the control method further comprises:
   identifying adjacent overexposed pixels in the cached image in a case where there is the overexposed area in the cached image, wherein a number of the adjacent overexposed pixels is greater than or equal to a second predetermined number, pixel values of the overexposed pixels are equal to the predetermined pixel value, the predetermined pixel value is an upper limit of a dynamic range of the imaging device, and the adjacent overexposed pixels belong to the overexposed area.

4. The control method as claimed in claim 1, further comprising:
   searching for a white area of the cached image in a case where there is no overexposed area in the cached image;
   estimating a color temperature according to the white area; and
   performing white balance processing on the cached image according to the color temperature.

5. The control method as claimed in claim 1, wherein acquiring, in a case where there is the overexposed area in the cached image, the RGB channel value of the surrounding area around the overexposed area comprises:
   identifying, in the cached image, a third predetermined number of material pixels centered around the overexposed area, wherein the material pixels belong to the surrounding area.

6. The control method as claimed in claim 1, wherein performing white balance processing on the cached image according to the RGB channel value comprises:
   determining average values of RGB channels of the surrounding area around the overexposed area;
   calculating a gain of an R channel and a gain of a B channel according to the average values; and
   performing white balance processing on the cached image according to the gains.

7. A control device for controlling an imaging device, the control device comprising:
   at least one processor; and
   a computer readable storage medium, coupled to the at least one processor and storing at least one computer executable instructions which, when being executed by the at least one processor, cause the at least one processor to carry out following program modules:
   a judgment module, configured to process a cached image output by the imaging device to identify whether there is an overexposed area in the cached image;
   an acquisition module, configured to acquire, in a case where there is the overexposed area in the cached image, an RGB channel value of a surrounding area around the overexposed area; and a first processing module, configured to perform white balance processing on the cached image according to the RGB channel value.

8. The control device as claimed in claim 7, wherein the judgment module comprises:

a judgment unit, configured to determine, according to a histogram of the cached image, whether a number of overexposed pixels having pixel values equal to a predetermined pixel value in the cached image is greater than or equal to a first predetermined number; and a determination unit, configured to determine that there is the overexposed area in the cached image in a case where the number of the overexposed pixels is greater than or equal to the first predetermined number.

9. The control device as claimed in claim 8, wherein the judgment module further comprises:

an identification unit, configured to identify adjacent overexposed pixels in the cached image in a case where there is the overexposed area in the cached image, wherein a number of the adjacent overexposed pixels is greater than or equal to a second predetermined number, pixel values of the overexposed pixels are equal to the predetermined pixel value, the predetermined pixel value is an upper limit of a dynamic range of the imaging device, and the adjacent overexposed pixels belong to the overexposed area.

10. The control device as claimed in claim 7, wherein the at least one computer executable instructions, when being executed by the at least one processor, cause the at least one processor to further carry out following program modules:

a searching module, configured to search for a white area of the cached image in a case where there is no overexposed area in the cached image;

an estimation module, configured to estimate a color temperature according to the white area; and a second processing module, configured to perform white balance processing on the cached image according to the color temperature.

11. The control device as claimed in claim 7, wherein the acquisition module comprises:

an identification unit, configured to identify, in the cached image, a third predetermined number of material pixels centered around the overexposed area, wherein the material pixels belong to the surrounding area.

12. The control device as claimed in claim 7, wherein the first processing module is configured to:

determine average values of RGB channels of the surrounding area around the overexposed area;

calculate a gain of an R channel and a gain of a B channel according to the average values; and perform white balance processing on the cached image according to the gains.

13. A mobile terminal, comprising a housing, a processor, a memory, a circuit board, a power circuit and an imaging device, wherein the circuit board is disposed inside a space enclosed by the housing, and the processor and the memory are disposed on the circuit board; the power circuit is configured to supply power to various circuits or devices of an electronic device; the memory is configured to store executable program codes; and the processor runs programs corresponding to the executable program codes by reading the executable program codes stored in the memory to perform the following operations:

processing a cached image output by the imaging device to identify whether there is an overexposed area in the cached image;

acquiring, in a case where there is the overexposed area in the cached image, an RGB channel value of a surrounding area around the overexposed area; and performing white balance processing on the cached image according to the RGB channel value.

14. The mobile terminal as claimed in claim 13, wherein the processor is further configured to perform the following operations:

determining, according to a histogram of the cached image, whether a number of overexposed pixels having pixel values equal to a predetermined pixel value in the cached image is greater than or equal to a first predetermined number; and determining that there is the overexposed area in the cached image in a case where the number of the overexposed pixels is greater than or equal to the first predetermined number.

15. The mobile terminal as claimed in claim 14, wherein the processor is configured to perform the following operations:

identifying adjacent overexposed pixels in the cached image in a case where there is the overexposed area in the cached image, wherein a number of the adjacent overexposed pixels is greater than or equal to a second predetermined number, pixel values of the overexposed pixels are equal to the predetermined pixel value, the predetermined pixel value is an upper limit of a dynamic range of the imaging device, and the adjacent overexposed pixels belong to the overexposed area.

16. The mobile terminal as claimed in claim 13, wherein the processor is configured to perform the following operations:

searching for a white area of the cached image in a case where there is no overexposed area in the cached image;

estimating a color temperature according to the white area; and performing white balance processing on the cached image according to the color temperature.

17. The mobile terminal as claimed in claim 13, wherein the processor is configured to perform the following operations:

identifying, in the cached image, a third predetermined number of material pixels centered around the overexposed area, wherein the material pixels belong to the surrounding area.

18. The mobile terminal as claimed in claim 13, wherein the processor is configured to perform the following operations:

determining average values of RGB channels of the surrounding area around the overexposed area;

calculate a gain of an R channel and a gain of a B channel according to the average values; and perform white balance processing on the cached image according to the gains.

19. The mobile terminal as claimed in claim 13, wherein the mobile terminal comprises a mobile phone or a tablet.

20. A non-transitory computer-readable storage medium, having an instruction stored therein, wherein when a processor of an electronic device executes the instruction, the electronic device executes the control method as claimed in claim 1.

* * * * *